United States Patent [19]
Baxter, Jr. et al.

[11] Patent Number: 5,229,651
[45] Date of Patent: Jul. 20, 1993

[54] METHOD AND APPARATUS FOR LINE POWER MONITORING FOR UNINTERRUPTIBLE POWER SUPPLIES

[75] Inventors: Richard V. Baxter, Jr., Neenah; Frederick A. Stich, Wisconsin Rapids, both of Wis.

[73] Assignee: Best Power Technology, Inc., Necedah, Wis.

[21] Appl. No.: 404,902

[22] Filed: Sep. 8, 1989

[51] Int. Cl.$^5$ .......................... H02H 3/24; H02H 3/50
[52] U.S. Cl. ...................................... 307/66; 364/487; 340/661
[58] Field of Search .............. 307/66, 80, 64, 85, 307/86, 87, 43, 44, 45, 46, 47, 48; 364/480, 481, 483, 487, 492; 363/74, 75; 340/660, 661, 662, 663; 361/79; 324/102

[56] References Cited

U.S. PATENT DOCUMENTS

| | | |
|---|---|---|
| 3,662,182 | 5/1972 | Ulmann et al. |
| 3,758,763 | 9/1973 | Nohara et al. .................. 423/415 R |
| 3,927,309 | 12/1975 | Fujiwara et al. ..................... 364/574 |
| 4,031,463 | 6/1977 | Norberg .............................. 361/86 X |
| 4,064,488 | 12/1977 | Chapman ............................. 328/136 |
| 4,132,947 | 1/1979 | Weischedel et al. ............. 324/77 A |
| 4,219,860 | 8/1980 | DePuy .................................. 361/94 |
| 4,370,723 | 1/1983 | Huffman et al. .................. 307/35 X |
| 4,510,57. | 4/1985 | Dagostino et al. ................. 364/487 |
| 4,692,854 | 9/1987 | Baxter, Jr. et al. ................... 363/75 |
| 4,694,402 | 9/1987 | McEachern et al. .............. 364/487 |
| 4,713,553 | 12/1987 | Townsend et al. .............. 307/66 X |
| 4,769,760 | 9/1988 | Kroll et al. .......................... 364/487 |
| 4,782,241 | 11/1988 | Baker et al. ........................... 307/66 |
| 4,797,936 | 1/1989 | Nakatsugawa et al. ............ 364/487 |
| 4,814,934 | 3/1989 | Jones et al. ............................ 361/88 |
| 4,860,149 | 8/1989 | Johnston ............................... 361/79 |

FOREIGN PATENT DOCUMENTS 2025005 12/1971 Fed. Rep. of Germany .
WO8501157 3/1985 PCT Int'l Appl. .

OTHER PUBLICATIONS

Trimble, Charles R., et al.; Hewlett Packard Journal Apr. 1968, vol. 19, No. 8; Palo Alto, California; pp. 1–16.
Alexander McEachern, "Some Initial Results of Recent Developments in Graphic Power-line Disturbance Monitoring," IEEE Transactions on Power App. and Systems, Mar. 1986, pp. 571–577.
Basic Measurement Instruments PowerScope Technical Sales Manual, pp. 8–9.
Basic Measurement Instruments PowerScope User's Guide, pp. 348–349.
Best Power Technology, Inc. Service Manual, Apr. 1989, pp. 50–51.

*Primary Examiner*—A. D. Pellinen
*Assistant Examiner*—Fritz M. Fleming
*Attorney, Agent, or Firm*—Foley & Lardner

[57] ABSTRACT

AC line monitoring is provided for uninterruptible power supplies to detect AC power system line faults by comparing the presently received cycle of the AC power line signal with a reference waveform. The reference waveform is formed of a composite of waveforms from prior cycles which adapts over time to the shape of the AC power line waveform, so that waveforms other than pure sinusoids can be accepted without triggering false fault conditions. The composite reference waveform may be formed of essentially all samples from prior cycles with exponentially decaying weighting. An excessive deviation of the current waveform from the reference waveform results in a fault being detected which causes switching of the uninterrupible power supply to provide backup power. The RMS value of the power line voltage is also estimated on a substantially real time basis, preferably by calculating the RMS value of the reference waveform, to provide a fault condition signal when the estimated RMS value falls below a selected level, which also can be utilized to cause switching of the uninterruptible power supply.

42 Claims, 9 Drawing Sheets

5,229,651

METHOD AND APPARATUS FOR LINE POWER MONITORING FOR UNINTERRUPTIBLE POWER SUPPLIES

FIELD OF THE INVENTION

This invention pertains generally to the field of electrical power systems, to the monitoring of line power waveforms, and particularly to the monitoring of line power for controlling the operation of uninterruptible power supplies.

BACKGROUND OF THE INVENTION

Uninterruptible power supplies are in common use today particularly for supplying large computer systems where loss of line power can result in the interruption of programs and loss of valuable data. Such uninterruptible power supplies may also provide a signal conditioning function to ensure that transient spikes, low voltage conditions, or distorted power waveforms on the AC power system do not disturb the operation of the computer to which the uninterruptible power supply (UPS) is connected. Typically, the UPS includes a battery which is interfaced through an inverter to the AC output power line. One type of UPS operates in such a way that when a fault occurs in the input AC power, the inverter is controlled to provide power from the battery to the AC output line which has the same frequency and substantially the same waveform as the normal input AC power. Preferably, the switching at the time of fault is accomplished as smoothly as possible so that substantial transient spikes or dips in the waveform supplied to the AC output lines does not occur. The coupling of the inverter to the AC output may be through a ferroresonant transformer as illustrated in U.S. Pat. No. 4,692,854, to Richard V. Baxter et al. entitled METHOD AND APARATUS FOR MODULATING INVERTER PULSE WIDTH, the disclosure of which is incorporated herein by reference.

A major factor in the ability of a UPS to switch smoothly from failing line power to battery power is sufficiently rapid detection of the line power fault. Preferably, power can be switched to the battery backup within a small fraction of a cycle while nonetheless maintaining a system which is relatively insensitive to minor transient conditions and disturbances which are not indicative of a significant fault. An overly sensitive switching scheme would result in "false positives" such that the UPS would be switched in at a time when it is not necessary.

One approach which has been used for line fault detection is to provide a table of reference values for each cycle of the power waveform (e.g., the 60 Hz power waveform used in the United States). The voltage on the AC power line should conform substantially to a sine wave at the line frequency whose phase does not change. Each cycle of the waveform on the AC power line can then be sampled at specific points in time during the cycle and the values of the samples can be compared to the nominal table values, with a default being indicated when the difference at each of the sample times exceeds a predetermined tolerance limit.

Certain forms of waveform distortion are commonly seen which do not necessarily indicate a power line failure so that the UPS should not switch when such distortions occur. Two examples of such waveform distortion are shown in FIG. 1 which are commonly seen by a UPS. An idealized form of third harmonic distortion is shown by the waveform labeled 11 in FIG. 1. Quite often, this sort of distortion is caused by magnetic saturation of transformers and is usually more pronounced at the trailing side of the waveform. A flat-topped waveform 12 is also shown in FIG. 1 which can be caused by a non-linear load such as a switched-mode power supply. To avoid nuisance switching of the UPS where such distorted line voltage sources are present, special reference tables can be programmed into the controls for the UPS units so that they will not switch unnecessarily when such a waveform is present. In effect, the comparison between the input AC waveform and the reference has been "desensitized" so that a greater distortion of the waveform must occur before a fault will be found than ordinarily would be preferred, since the system will now be less sensitive to actual power line failure conditions which may mimic the forms of distortion shown in FIG. 1. For example, the waveform 13 shown in FIG. 2 shows the type of line failure which can occur in a network connected to rotating machinery or ferroresonant transformers. In this case, the line voltage rings-down at a rate which is dependent on the load. With a desensitized reference table, the voltage on the power line would need to decay to a level substantially lower than desirable before detection occurs. An undesirably large disturbance in the output voltage can result.

Another factor affecting detection of power line failure is the sensitivity of detection at various phase angles of each half-cycle of the input waveform. It has been found that in typical plots of cycle to cycle deviation of AC power, deviations generally do not occur during the peak of the waveform but rather are more prevalent toward the zero-crossings. In particular, with a ferroresonant transformer as the source, a small amount of phase perturbation can accentuate deviation around the zero-crossings. Thus, a detection method which would be based on percentage change of the waveform is generally not an effective way of fault detection. Generally, it is better to have an absolute difference of equal value for all samples as the criterion or, for severe cases, larger (programmable) tolerances for the differences at the zero crossings.

It is further desirable to minimize unnecessary switching of the UPS due to power line surges so that switching does not occur unless the surge represents a persistent change in the power system voltage.

SUMMARY OF THE INVENTION

In accordance with the present invention, line power monitoring for uninterruptible power supplies is provided by adaptively producing a reference waveform to which the present waveform is compared. The reference waveform changes at a relatively slow rate so that a moderate change in the voltage waveform indicative of a fault will be detected, while the reference can adapt and conform to systematic distortions of the power line from a pure sine wave which are not indicative of power line failure so that a unnecessary switching of the UPS is avoided.

In the line monitoring apparatus of the present invention, a reference waveform is produced having values at selected sample times during the period of the input waveform such that each reference sample is the selectively weighted average of samples occuring over several prior cycles of the input waveform. Preferably, the reference waveform is formed as the weighted average at each sample time of the prior cycle and the previous average value, an exponential averaging in which the values of the samples in all prior cycles are averaged together with a weighting which decreases exponentially moving backward in the time of the sample. The current cycle is then compared to the reference cycle and a fault signal is provided if the present cycle deviates from the reference cycle by more than a selected tolerance level.

A preferred procedure for determining the reference level is carried out in accordance with the expression:

$$REF_{i,k} = (1-a)REF_{i,k-1} + a\ SAMP_{i,k-1}$$

where "a" is choosen such that $0 < a < 1$, $REF_{i,k-1}$ is the value of the reference at the i th sample point in the cycle and at the (k−1)th cycle, and $SAMP_{i,k-1}$ is the value of the sample of the input waveform at the i th sample point in the cycle and at the (k−1)th cycle. The comparison between the sample and the reference is preferably carried out in accordance with the expression:

$$|SAMP_{i,k} - REF_{i,k}| \geq D_i$$

where $D_i$ is a choosen tolerance value which can be a constant or which can vary as a function of the cycle sample position i. For example, where a 60 Hz power line is being sampled, sampling can be carried out at 64 times a cycle with the sampling times phase-locked to the period of the input signal so that the samples from the subsequent waveforms are taken at the proper points on the cycles. By phase locking the sampling of the present cycle to the cycle period, samples will be taken at properly corresponding places on the input waveform which can be properly compared to the reference waveform even if the line frequency changes slightly.

To ensure that a slowly varying or ringing-down type of line failure is detected, the apparatus of the invention further estimates on a substantially real-time basis the root mean-square (RMS) value of the input power waveform. Preferably, this is carried out by an RMS computation on the stored reference waveform. When the RMS voltage estimate falls below a threshold value, a signal is provided to switch the UPS system to provide auxiliary power to the output lines from the battery. The combination of the RMS estimate fault detection and the continuous comparison of the present waveform cycle with the reference waveform provides a unique combination of sensitivity to rapidly occurring line failures, non-sensitivity to systematic non-failure waveform distortions and voltage transients, and accurate detection of a slowly decaying power failure.

The line monitoring of the invention may be carried out under computer control with the samples from the AC input being digitized, the reference waveform being calculated by a microprocessor to provide a reference waveform stored in memory, and a digital comparison being made of the new cycle waveform with the reference cycle waveform.

Further objects, features and advantages of the invention will be apparent from the following detailed description when taken in conjunction with the accompanying drawings.

DETAILED DESCRIPTION OF THE INVENTION

Figure 4:
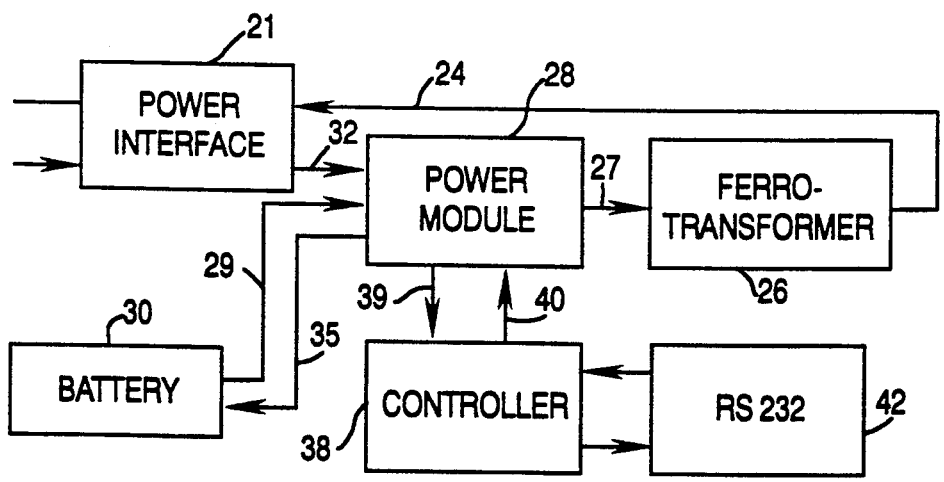
FIGS. 4 is a block diagram of an uninterruptible power supply system in accordance with the invention.

With reference to the drawings, an uninterruptible power supply (UPS) system utilizing the adaptive AC line monitoring of the present invention is shown generally in block diagram form in FIG. 4. The UPS receives AC input power from the power system on lines 20 connected to a power interface 21 which provides AC output power on lines 22 to the equipment consuming this power, such as computers and other electrical equipment which require reliable or conditioned power. The power interface 21 is a conventional unit well known in the art which delivers power to the AC output lines 22 from supply lines 24 and receives power from the AC input lines 20. For the UPS shown in FIG. 4, the power on the lines 24 is provided through a ferroresonant transformer 26, although other conventional UPS structures may be utilized in accordance with the present invention. The ferroresonant transformer 26 is driven with power on a line 27 from a power module 28 which receives line power on line 32 and the backup electrical power on lines 29 from an energy storage device such as the battery 30 shown in FIG. 4. A controller 38 receives electrical signals on lines 39 from the power module 28 for monitoring the AC input lines 32. The power module is controllable to provide a charging current on lines 35 to the battery 30 under normal operating conditions, drawing power from the AC power lines 20 to charge the battery. The controller 38 receives signals on lines 39 from the power module 28 to monitor the operating conditions of the module and provides output control signals on lines 40 to the module to control its operation. The controller 38 is connected to input/output devices and ports 42 for communication with an operator or with other remote equipment.

Figure 2:
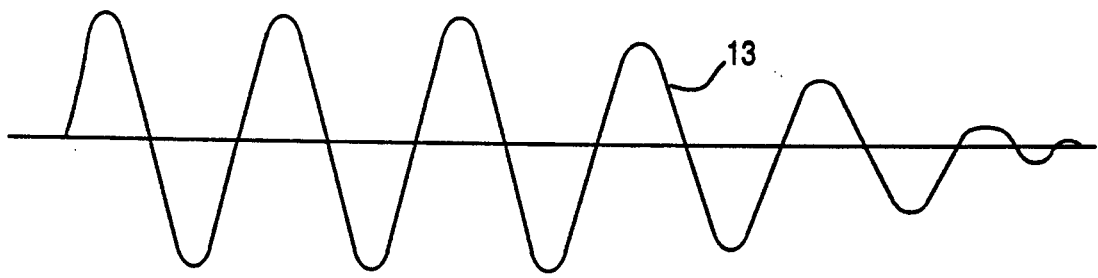
FIGS. 2 is an illustrative graph showing a ring-down type of power line failure.

During normal operating conditions when the AC power on the AC input lines 20 is fault free, the power module 28 connects the AC input lines 32 to the ferroresonant transformer 27 and also receives power from the lines 32 and delivers a charging current to the battery 30. The controller 38 also monitors the AC voltage provided on the line 32 to the power module to look for a fault condition. As described above, such fault conditions may take the form of a sudden loss of AC power, or a more gradual "ring-down" of the AC power on the input lines 20. When the controller 38 detects such a fault, it provides a control signal to the power module 28 to cause the power module to deliver power from the battery 30 to the ferro-transformer 26 in such a way that the waveform of the AC power now provided on the line 24 will substantially match the waveform on the AC input line 20 before the power outage, both in magnitude, frequency, and phase. The transfer of the power supply from the AC input lines 20 to the battery 30 may be accomplished within a small fraction of a cycle of the 60 Hz power line frequency so that the consuming equipment connected to the AC output lines 22 sees very little disruption of the waveform of the power supplied to it. The controller 38 must respond quickly enough to determine if a fault has occurred in less than a quarter-cycle of the AC input power, yet must not over-react to transient conditions which do not indicate a fault or power failure, or to long term operating conditions which result in a distortion of the AC power on the input lines 20 from a pure sinusoid but which otherwise do not indicate a power system failure. The controller 38 must also be able to detect a ring-down type of line failure, as illustrated in FIG. 2, where the AC power declines gradually rather than abruptly.

Figure 1:
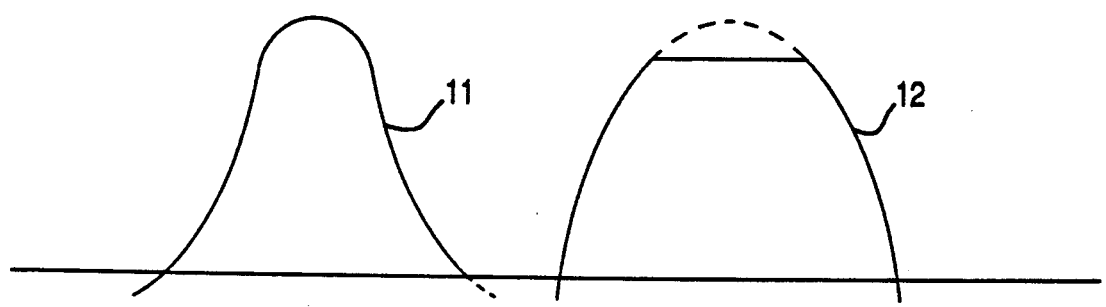
FIGS. 1 are illustrative graphs of common examples of distorted power line waveforms.
Figure 3:
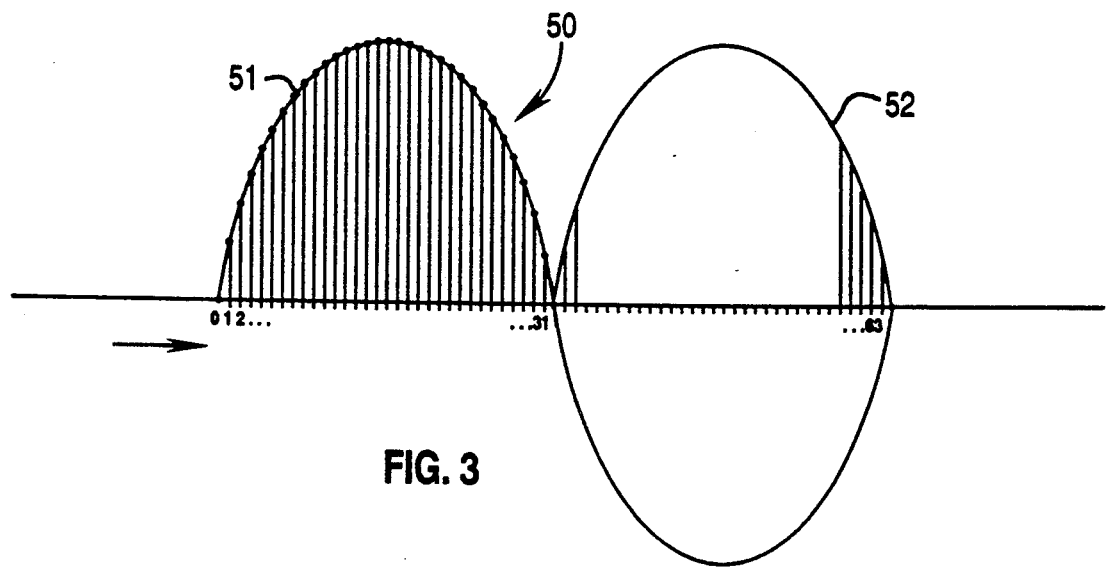
FIGS. 3 is a graph illustrating sampling of the AC power line input waveform for comparison with a reference waveform in accordance with the invention.

In accordance with the present invention, the controller 38 constructs a reference waveform in an adaptive manner which is a composite of many previous cycles of the AC waveform on the input lines 20. The composite is formed so that the reference waveform will adapt itself in shape to a systematically distorted waveform such as those shown in FIG. 1, which are not indicative of a line fault. The preferred manner of constructing the reference waveform is shown in FIG. 3. The reference waveform consists of a series of samples which span the full cycle of the input waveform, e.g., the 64 equally spaced samples shown in FIG. 3 which cover the full period of one 60 Hz cycle (16.67 msec.). The reference waveform 50 is composed of a first half-cycle 51 and a second half-cycle 52 which, as shown in FIG. 3, may be rectified so that both have only positive sample values. At each sample time i after the start of the cycle (e.g., i extending from 0 to 63 to cover the full one-sixtieth of a second cycle period) the value of the reference waveform at that time is formed as an average of a sample at a corresponding point in time i from the last cycle of the input AC waveform and a weighted average of samples at corresponding points in time on many previous cycles. For example, the average may be formed as an exponential average of the last cycle sample with exponentially decaying weighted sums of all previous cycles. Such an exponential averaging can be a calculated in accordance with the following expression:

$$REF_{i,k} = (1-a)REF_{i,k-1} + (a)SAMP_{i,k-1}$$

where $0 < a < 1$, $REF_{i,k}$ is the value of the reference waveform for the cycle k at the cycle sample point i, $REF_{i,k-1}$ is the reference waveform which was previously calculated at the sample i for the k−1 cycle, and $SAMP_{i,k-1}$ is the value of the sample at the time i in the k−1 cycle. Although the value of a can range within the open set from 0 to 1 and obtain averaging, it is preferred that the value of a be substantially equal to 0.5.

Various well known techniques may be utilized to compare the present cycle of the incoming AC waveform with the reference to determine if a line fault has occured. One technique determines the difference in magnitude between the present sample at the sample time i and the reference for the sample time i and determines whether the difference exceeds a selected tolerance limit. This fault condition may be expressed as $$|SAMP_{i,k} - REF_{i,k}| \geq D_i$$

where $SAMP_{i,k}$ is the sample in present cycle k at the sample time i and $D_i$ is a tolerance limit which has been choosen to yield the desired degree of sensitivity. The value $D_i$ may be a constant for all sample times i or can vary as a function of i. The value of $D_i$ can be obtained from a look-up table of 64 values indexed by i. The values in the look-up table can be selected, for example, from experimental data obtained by testing the response of the system to various fault conditions. The line default may be determined whenever, for any one of the sample times i, the difference between the sample and the reference is greater than or equal to the tolerance limit $D_i$. The decision may also be made with various other criteria such as when a certain number of samples out of a selected number of consecutive samples exceed the tolerance limit, or when a selected number of consecutive samples is over the tolerance limit, or when a selected pattern of samples is over the tolerance limit. A preferred technique is to keep a running count which is incremented for each new sample that exceeds the tolerance limit and decremented for each new sample that is within the tolerance limit. In addition, multiple tolerance limits may be established such that the difference between the sample and the reference at each sample time may be found to be within various ranges of tolerance limits.

In addition to providing a fast comparison between the reference waveform and the present cycle (i.e., a criterion which will detect a fault occuring within a fraction of a cycle of the 60 Hz waveform), the controller 38 also preferably examines the incoming AC power to detect unacceptably low levels, i.e., a ring-down condition or possible "brownout" where the line voltage drops to an unacceptably low level. To monitor the actual line voltage, a root-mean square calculation is performed on the AC input power. This may be carried out by accumulating one cycle of new samples and performing the RMS calculation over the cycle after all data has been gathered. However, such a calculation could be affected by short transients which would distort the apparent RMS value from the actual steady-state RMS value. To reduce the effect of such transients while still obtaining an essentially real-time estimate of the RMS value of the incoming waveform, it is preferred that the RMS calculation be performed on the reference waveform as it is updated each cycle. For example, the RMS estimate may be performed in accordance with the expression:

$$V_{rms}(est) = \sqrt{\frac{1}{n}\sum_{i=0}^{n-1} REF_{i,k}^2}$$

where n is the number of samples in each cycle (e.g., 64).

A brownout condition would be detected if the value of $V_{rms}(est)$ is less than a value $V_{rms}(min)$ which is choosen as the minimum acceptable RMS voltage level.

Figure 5:
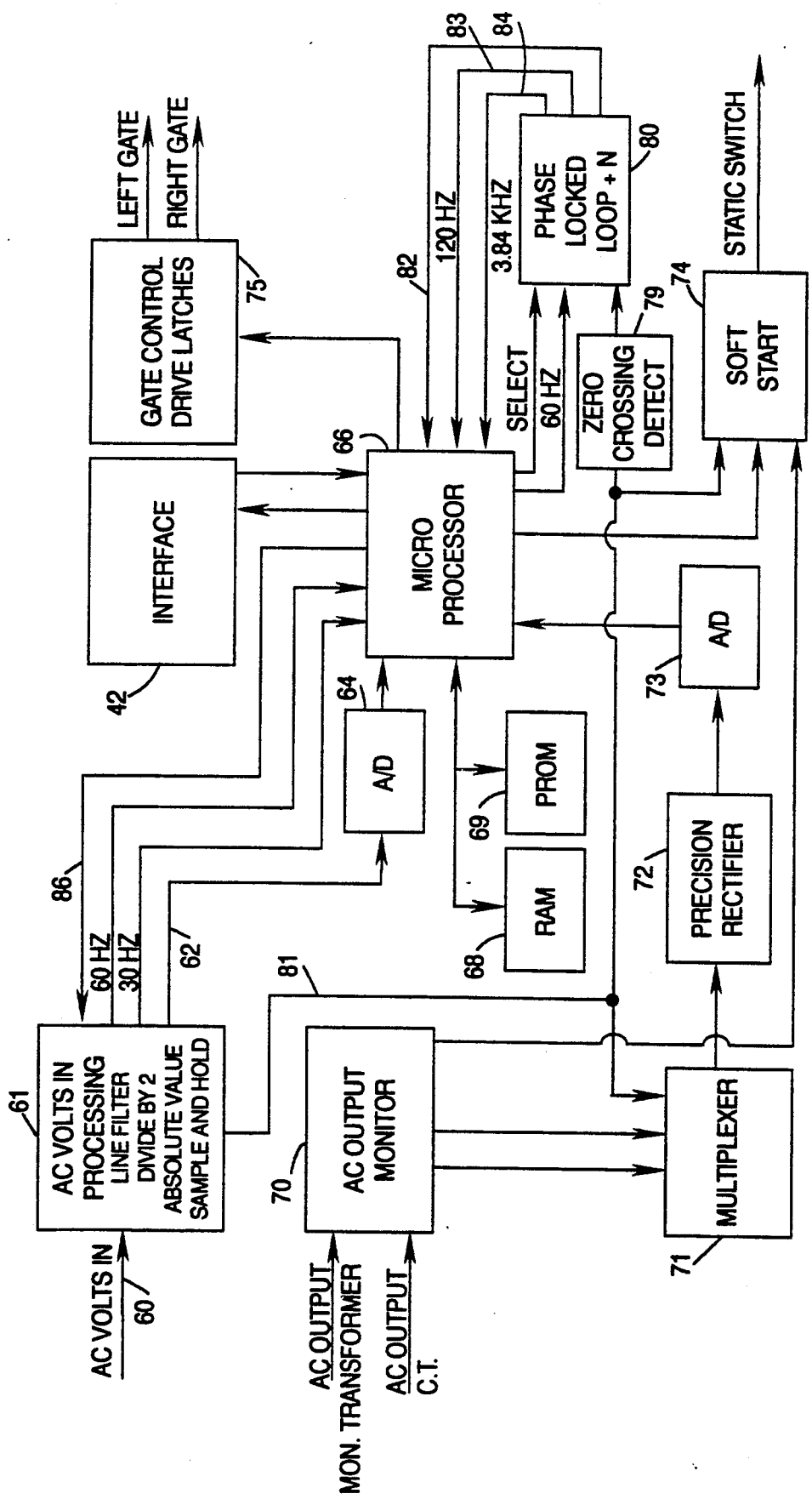
FIGS. 5 is a block diagram of the line monitoring apparatus for utilization in a UPS system in accordance with the invention.

A block diagram of a microprocessor implemented controller 38 for the UPS system of FIG. 4 is shown in FIG. 5. This controller, in addition to its other duties in the UPS, carries out the adaptive line monitoring of the present invention. Among the input signals that the controller receives on the lines 39 is the AC input line voltage, which is received by the controller on a line indicated at 60 in FIG. 5. The AC voltage is received by a processing circuit 61 which filters the line voltage, performs an absolute value function on the voltage, and samples and holds the voltage at selected points in time. The filter removes high frequency disturbances on the AC input line which can cause false line detection. The filter is preferably a low Q, band pass filter centered at 60 Hz which exhibits zero phase delay. The samples from the sample and hold circuit are provided on a line 62 to an analog to digital converter 64, the digital output of which is provided to a microprocessor 66. The microprocessor is of conventional design which may selected from any of the various commercially available microprocessors or highly intergrated microcomputers and has associated random access memory 68 and programmable read only memory 69. Other conventional UPS circuitry connected to the microprocessor not directly related to the monitoring of the AC input power is an AC output monitor 70 which provides its output to a multiplexer 71. The output of the multiplexer is provided through a rectifier 72 and an analog to digital converter 73 to the microprocessor. The microprocesor communicates via the interface 42 with the operator or ancillary equipment. The output from the microprocessor for controlling the operation of the inverter in the power module 28 is provided through gate control drive latches 75. The microprocessor and other control components are provided with power from a power supply (not shown) in a conventional manner.

The controller also includes a phase-locked loop which includes a phase sensitive detector and voltage controlled oscillator circuit 80. The phase-lock circuit 80 receives the output of a zero-crossing detector 79 which is provided with 60 Hz line power at an appropriate voltage level on a line 81 from the AC processing unit 61. The phase-lock circuit provides an output signal on a line 82 to the microprocessor when the circuit 80 is synchronized with the phase of the line power. Such phase-locked loop systems are well known and have been used in commercially available UPS systems. The phase-lock loop system also provides an output signal synchronized to the 60 Hz line power at 120 Hz on a line 83 to the microprocessor and a synchronized 3.84 kHz signal on a line 84 to the microprocessor. The 3.84 kHz signal is at the sampling frequency required to sample the 60 Hz input waveform 64 times each cycle. Under the control of the microprocessor, the time of the sampling by the AC processing circuit 61 is controlled (by signals on a line 86) and the operation of the analog to digital converter 64 is controlled so that samples from the present cycle of the AC input waveform are substantially 1/64th of the cycle width apart, even if the frequency or phase of the AC input voltage changes slightly. Thus, each new sample as received by the microprocessor from the converter 64 can be placed by the microprocessor in a proper location in its RAM memory 68, added in a selected manner, with the existing value for that sample in RAM, e.g., by adding a properly weighted value of the present sample to a weighted value of the existing average, to produce the value for the reference waveform in the memory 68.

The computer controller can be implemented utilizing conventional connections of central processing unit (CPU), memory, peripherals, and signal conditioning devices. For example, the controller logic can be implemented using a NEC UPD78C10 single chip microcomputer as the computer 66 of FIG. 5, a 27C256 32K×8 EPROM 69 containing non-volatile program instructions and fixed data, and a 2K ×8 HY6116 RAM 68 for read/write data memory. A battery backup circuit is preferably provided for RAM data retention in the absence of primary logic power. The UPD78C10 single chip microcomputer is a high integration device containing an 8 bit CPU, 256 bytes of local data memory, 8 and 16 bit timer units, a serial communications interface, several digital I/O ports, and an 8 bit 8 channel analog to digital converter. The A to D converters associated with the chip may perform the functions of the A to D converters 64 and 73 of FIG. 5. An on-chip interrupt controller manages interrupts from the integrated peripheral devices in addition to interrupts from external interrupt input pins, two of which are preferably utilized in the line fault detection procedure. The CPU executes program instructions from the EPROM 69 with a stack being maintained in the 256 byte internal data memory to store return addresses and the machine context in the event of subroutine calls or interrupt processing.

In operation of the computer controller, the CPU normally executes a series of instructions in an endless MAIN program loop. This loop controls operation of communications with an external keyboard and display, LED indicator devices, and serial communications channels. These functions are primarily for set-up, calibration, and operator interface and may be carried in any desired conventional manner and are not directly relevant to the present invention. The main program loop is designed to be interrupted by time-critical tasks and other asynchronous events. Some of these tasks are, for example, metering and alarm scanning for the UPS, or service of the serial communications channel, and are not directly related to line fault detection. In an exemplary implementation of the present invention, line fault detection is controlled by two interrupt service routines. These interrupt routines are invoked by operation of external hardware interrupt pins on the CPU and temporarily suspend the operation of the main program loop. The operation of these interrupt routines, designated as INT 1 and INT 2, are illustrated in the flow charts of FIGS. 6-11.

The INT 1 interrupt is executed nominally every 260.4 microseconds (i.e., at a rate of 3.84 kHz) where the invention is being utilized to monitor 60 Hz line power, and is initiated by the 3.84 kHz signal provided from the phase-locked loop. The interrupt rate is designed such that the line data samples are taken and processed in the fault detection algorithm 64 times per cycle. The exact frequency and phase is controlled by the phase-locked loop as described above. This phase-locked interrupt method insures the phase coherency of line data samples to be used in the detection algorithm regardless of input frequency and phase deviations.

When the interrupt routine INT1 is entered, the routine first saves the context of the CPU registers by switching to an alternate register bank reserved for this interrupt. In general terms, the routine then sets up and transfers the result of the analog to digital conversion to the data memory. At the same time that the capture and storage of the analog to digital conversion results is carried out, the line data input sample and hold circuit is controlled. The CPU directs the sample and hold circuit to sample the line input at a precise time and then hold the analog results for analog to digital conversion. The held value is converted and then available for processing in the subsequent INT 1 interrupt routine processing. This precise control of the line input sampling, in conjunction with the phase-locked interrupt, insures the phase coherency of samples for the fault detection algorithm.

The line sample digital data resulting from the analog to digital conversion is subtracted from a corresponding reference waveform data point stored in RAM memory, and the absolute value of the result is compared against an allowable difference value. The reference waveform represents a composite of previous corresponding samples, preferably formed by exponential averaging. The allowable difference can be fixed, programmable, or selected from an arbitrary table of difference values, using the same index as the reference waveform table. If the absolute value of the difference is less than the allowable difference value, a software counter is decremented, subject to a minimum allowable count of zero. Conversely, if the absolute value of the difference is greater than or equal to the allowable difference entry, the same software counter is incremented. The value of this counter is compared against a programmable terminal count, and the result of the comparison is used as the basis for determining if a line fault exists. If the counter value is greater than or equal to the terminal count, then a subroutine call is made to signal the line fault, and the appropriate action is taken. In the UPS embodiment the subroutine call turns on a power inverter, providing backup power to the critical load despite the fault in the input line AC power. The foregoing method of determining a fault is desirable because it provides an easily adjustable sensitivity and immunity from false triggering due to noise.

The INT 1 interrupt routine then calculates and stores the new reference table value by exponentially smoothing the present sample with the previous value of the corresponding reference entry. For example, binary weights selected at 0.5 and 0.5 are applied to sample and the previous table value respectively. Other weights can be used to control the rate at which the reference waveform tracks the input samples, but the use of power of 2 weights is preferred for code and execution time efficiency. The interrupt routine then increments a reference table index value and compares it against the maximum allowable value of (e.g.) 63. If the index value exceeds this number, it is reset to zero. The context of the CPU is restored to its states prior to the INT 1 interrupt, the primary register bank is selected, and processing returns to MAIN program loop.

Figure 6:
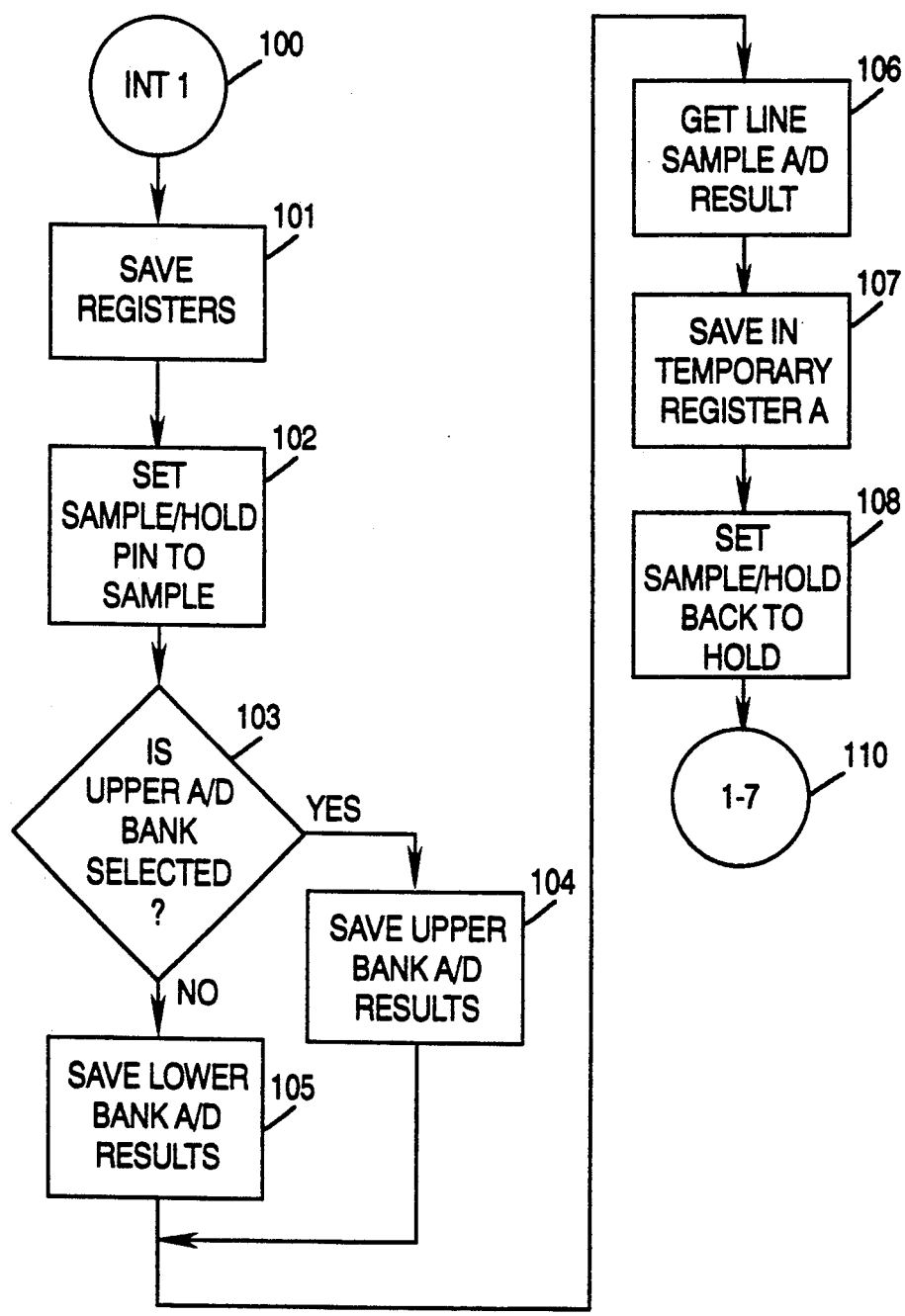
FIGS. 6-11 are flow charts showing the program steps carried out by the computer controller for the power line monitoring system for a UPS in accordance with the invention.
Figure 7:
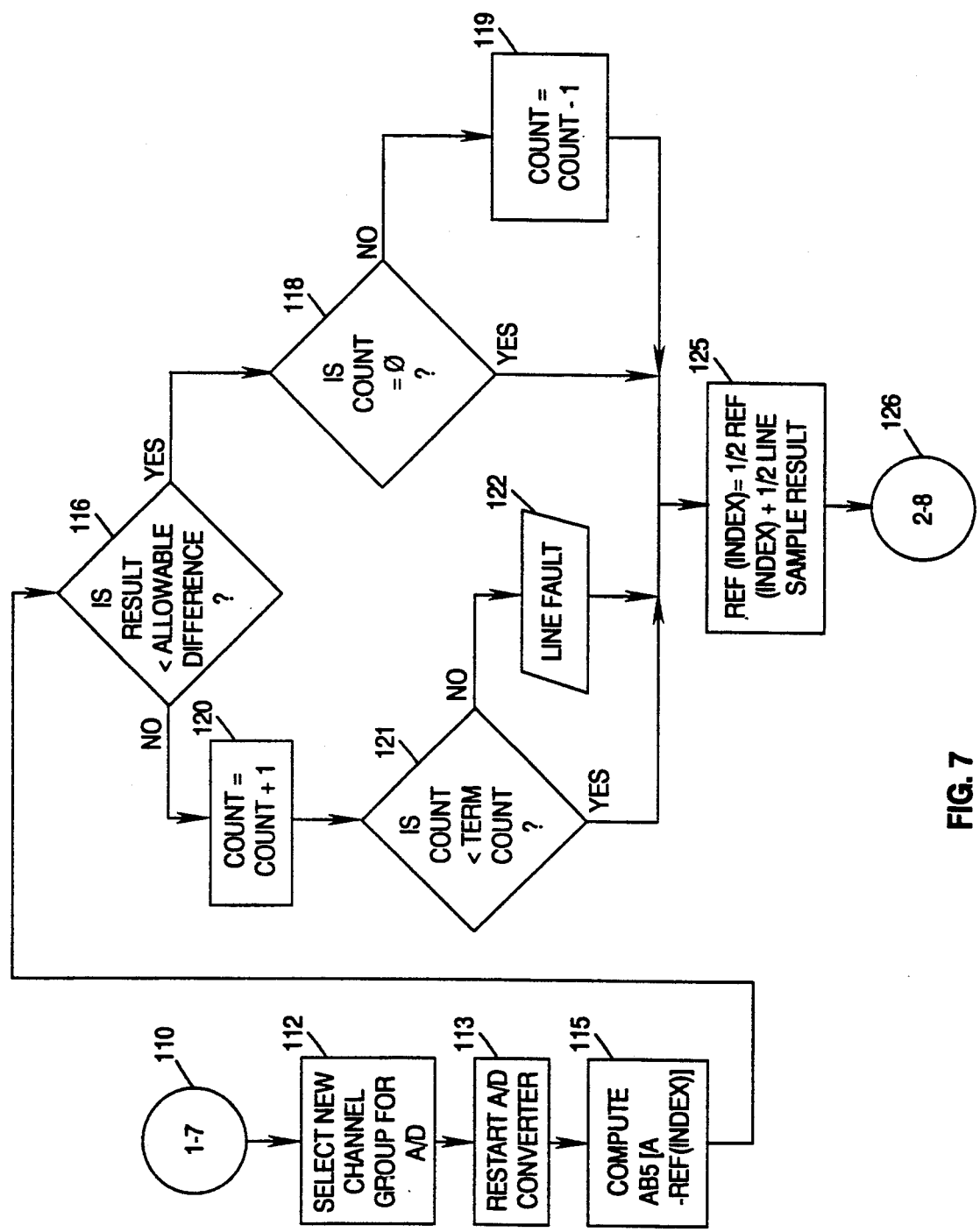
Figure 8:
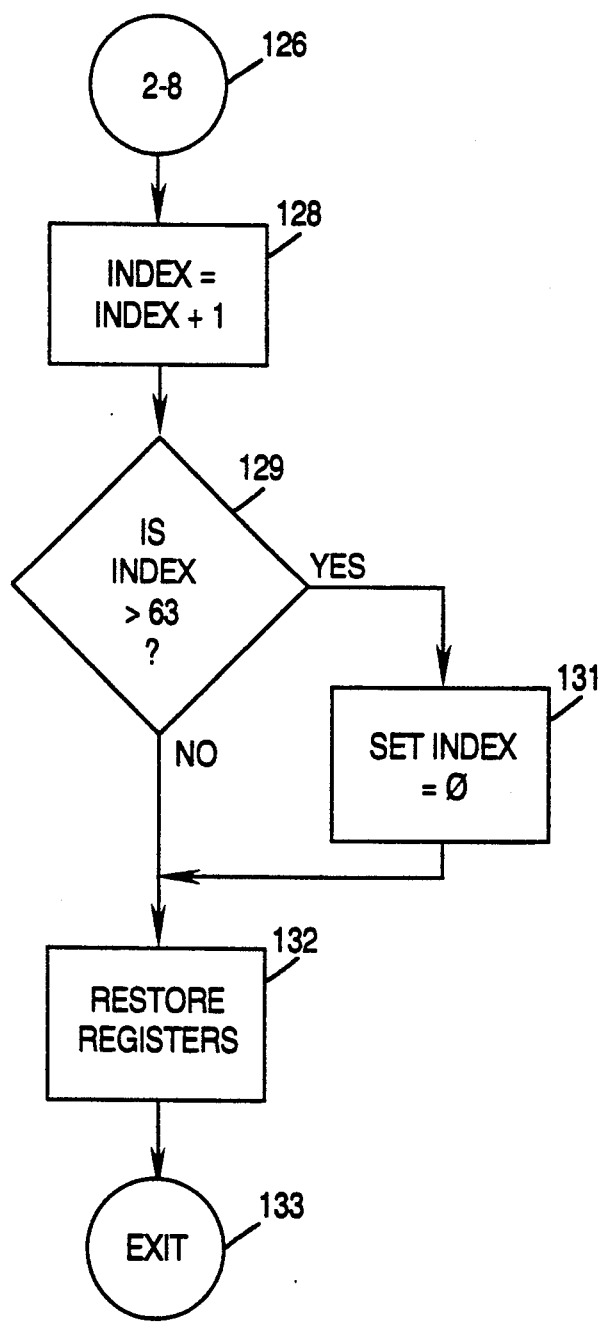

The steps carried out by the INT 1 routine are set forth in more detail in the flow charts of FIGS. 6-8. Upon entry into the interrupt at 100, the registers in the CPU are first saved (101) and the sample and hold pin of the CPU is set to the "sample" position (block 102). Because there are 2 A/D banks available in the CPU utilized, the program first determines if the upper A/D bank is selected (block 103) and if so, the upper bank A/D results are saved (block 104). If not, the lower bank A/D results are saved (block 105) and the program proceeds to get the line sample A/D result (block 106). This result is saved in the temporary register designated "A" (107) and the sample/hold pin is set back to hold (108). The program continues (110) as shown in FIG. 7 to select a new channel group for the A/D (112) and then restarts the A/D converter (113). A computation is then made of the absolute value of the difference between the content of the register A and the REFERENCE value for the index point in the cycle (block 115). The difference is then checked to see if the result is less than an allowable difference value (block 116) and if it is, the running value of the counter is checked to see if the count equals zero (118). If not, the value of COUNT is decremented by one (block 119) before continuing and if the value of COUNT is zero the program simply continues without changing the value of the COUNT. If at 116 the result was found to be greater than or equal to the allowable difference, the value COUNT is incremented by one (block 120) and the value COUNT is checked to see if it is less than the TERMINAL COUNT (block 121). If it is, the program continues; if it is not, the program sends a LINE FAULT message which is outputted to the control components to turn on the inverter (122).

The program then recalculates the reference utilizing the weighted average of the present reference at the present sample index value with the new line sample result to create the new reference value at the present sample index value (block 125) and then continues (126) as shown in FIG. 8.

At this point in the program, the value of the quantity INDEX is incremented by one (block 128) and then the value of INDEX is checked to see whether it is greater than 63 (block 129). If it is, the value of INDEX is set to zero (131). In either event, the program then continues and restores all the registers (132) before exiting from the interrupt routine(133).

A second CPU interrupt input is also connected to the phase-locked loop and is connected to receive the 120 Hz output signal from the loop, which is also phase-locked to the AC line input waveform of interest. This interrupt signals the start of each half-cycle, and occurs at the zero voltage crossings of the AC line input. It is used to control the reference table RMS detection. This interrupt routine can also be used to reset the reference table index used by the INT 1 interrupt routine if an arbitrary table of allowable difference values based on the position of the sample within a cycle is desired. Such would be the case if it were desired to desensitize the line fault detection algorithm in portions of the waveform that are expected to exhibit a high rate of change with respect to time, such as is the case near the zero-crossings.

The INT 2 interrupt routine begins with a context saving operation followed by control functions incident to the operation of the inverter, metering, alarm, and display functions. The routine then increments the software counter which, upon reaching a terminal count, invokes a routine to calculate the true RMS value of the exponentially smoothed reference waveform, employing a fast table basis Newton method square root algorithm and a numerical approximation to the mean of squares integral. The 64 entries of the reference waveform are individually squared and summed to a 24 bit sum of squares. The result of the sum of squares is divided by 64 using a repetitive right shift approach. The upper 8 bits of the resulting mean value are used as an index to a 256 byte table of square root approximations. The table value at the offset of the look up index is used as the first approximation to the input square root. A conventional Newton method iteration is then applied to calculate successive approximations, and the iteration stops when successive approximations are either zero or differ by an absolute value of only 1. The execution time efficiency of this method permits the calculation of the reference waveform RMS value as often as every cycle, if desired, although it is possible to calculate at a slower rate, for example, every other cycle.

The resulting RMS calculation is compared against a programmable minimum set point, and the result of this comparison is OR'ed with the line fault signal generated by the INT1 routine above, so that a fault from either the RMS calculation or the INT1 routine fault operation will send a fault signal to the UPS system to turn on the power inverter. The context of the machine prior to the interrupt routine is restored upon exit from the interrupt and entry back into the MAIN program loop.

Figure 9:
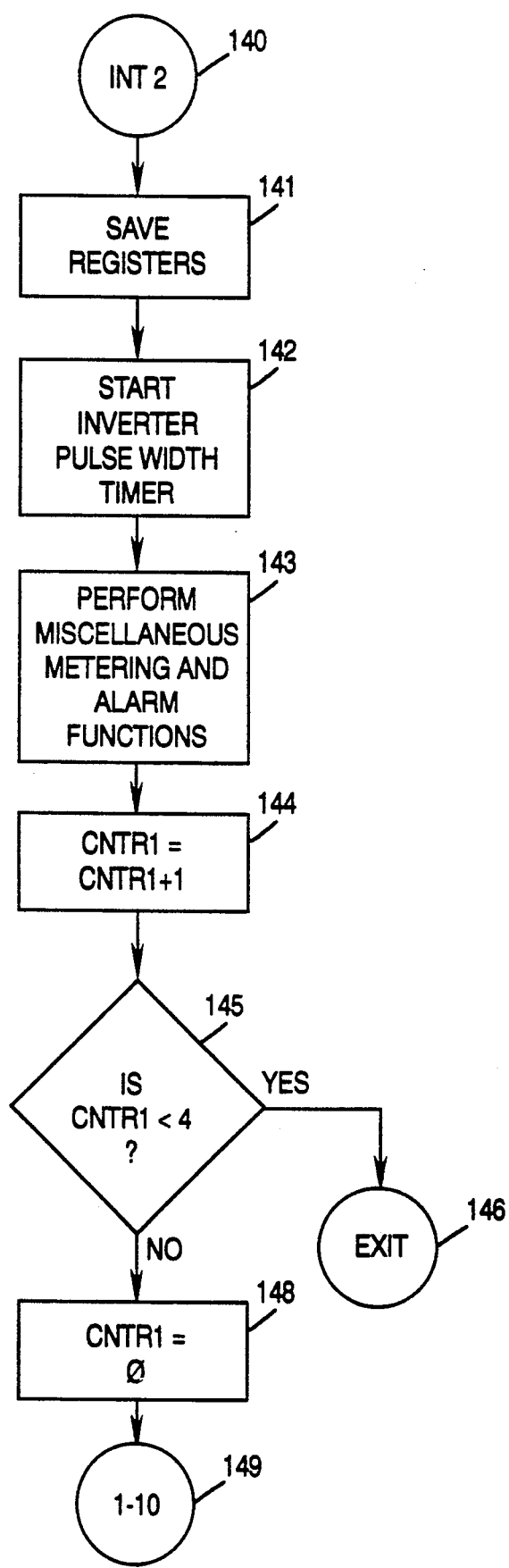
Figure 10:
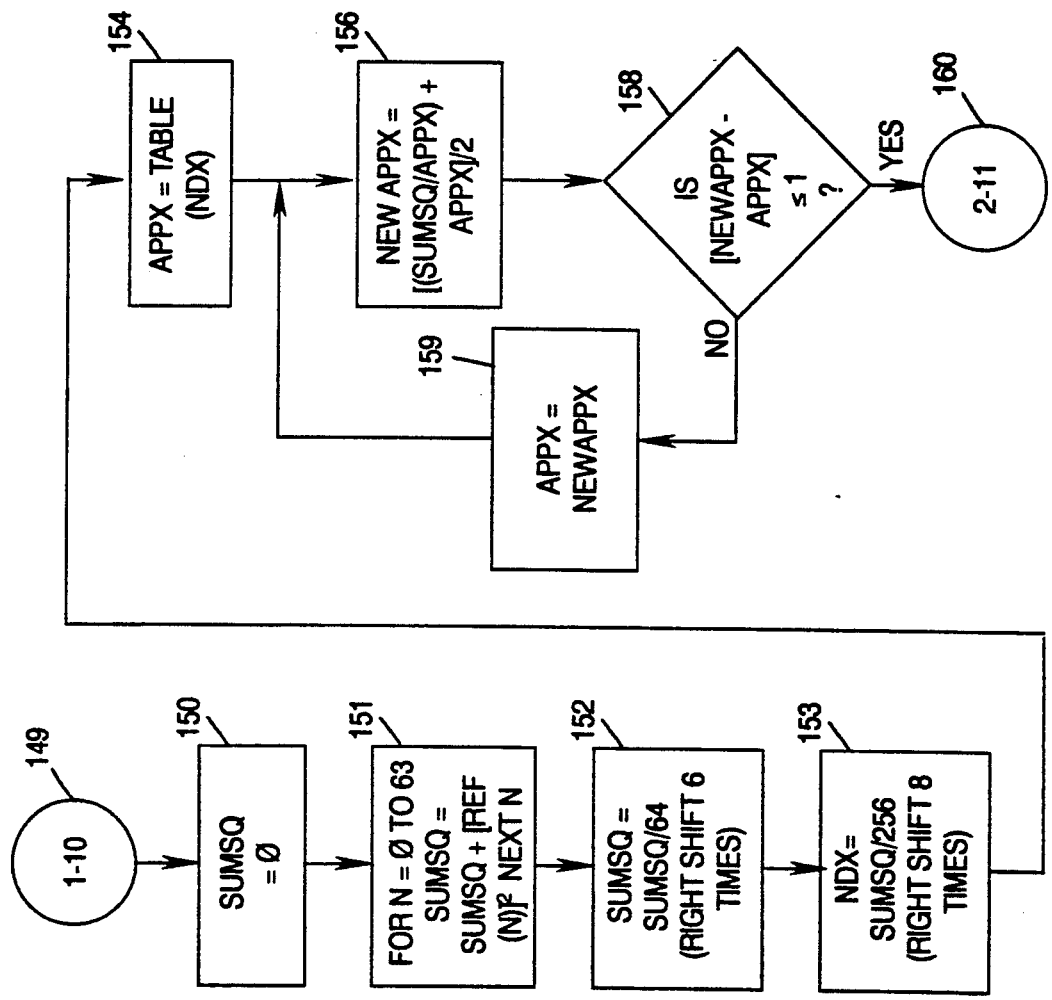
Figure 11:
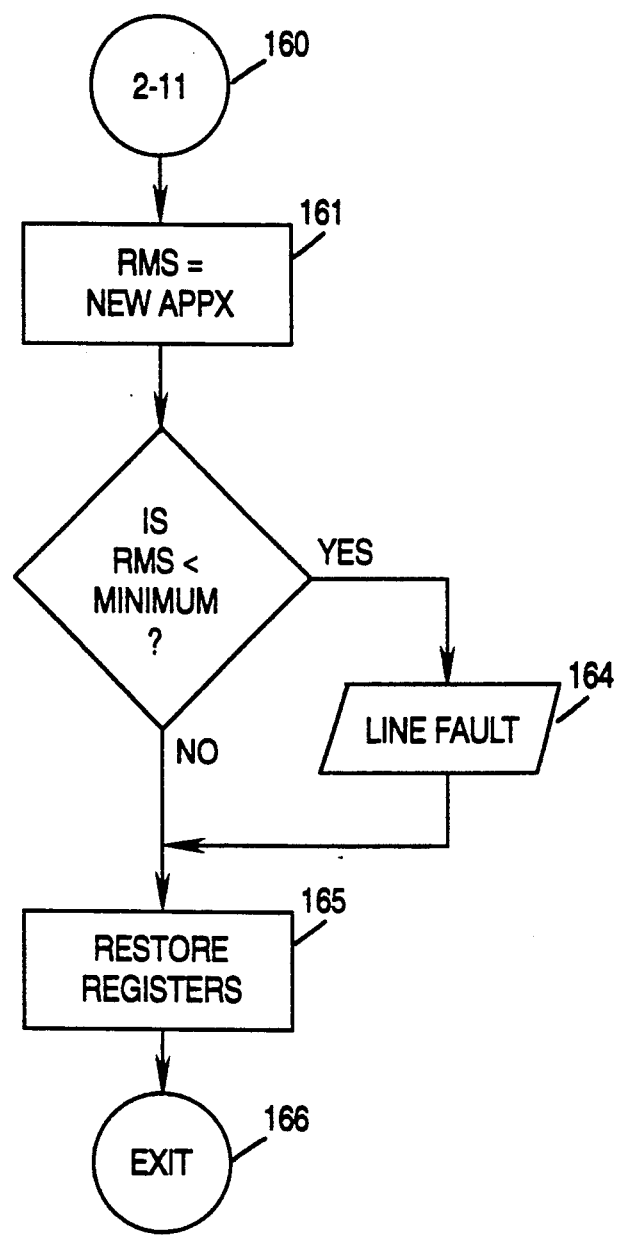

The operation of the INT 2 routine is shown in greater detail in the flow charts of FIGS. 9-11. Upon entry into the INT 2 routine (140) the register values are saved (141) and an inverter pulse width timer is started (142). Various metering and alarm functions are performed (143) and then the value of a counter variable CNTR1 is incremented (144). The resulting value is then checked to determine whether or not CNTR1 is less than 4 (145) and if it is, the program exits from the routine (146). If the value of the variable CNTR1 is not less than 4, its value is reset to zero (148) and the program continues (149) as shown in FIG. 10.

The value of a variable SUMSQ is then set equal to zero (150) and then a calculation of the sum of the squares of each of the 64 sample values in the reference waveform is performed (151). The resulting sum of the squares value SUMSQ is then divided by 64 (152) which can be accomplished by a binary right shift of six places, and then a value NDX is calculated as the value of the present SUMSQ divided by 256 (block 153). A variable APPX is then determined from a look-up table using the calculated number NDX as the index for the look-up table (154). This yields an approximation for the square root. A calculation is then carried out to calculate a variable NEWAPPX as shown in the block 156 in FIG. 10 according to a conventional Newton Method iteration whereby a closer approximation $A_2$ to the square root of a number N is determined by the formula $$A_2 = \left( \frac{N}{A_1} + A_1 \right)/2$$

where $A_1$ is the previous approximation. The difference between the new approximation value and the old approximation value is checked to see whether it is less than or equal to one (158). If it is not, the value of APPX is set to the value of NEWAPPX and the program iterates back to block 156 to perform the calculation again. This process continues until at the block 158 it is found that the difference between the variables NEWAPPX and APPX is less than or equal to one, at which point the program continues (160) as shown in FIG. 11.

At this point the RMS estimate is set equal to the value at that time of NEWAPPX (161) and then this RMS value is checked to see whether it is less than a selected MINIMUM value (163). If it is, a line fault message is sent (164) which can be used by the UPS system to turn on the inverter. In either case the program continues to restore the registers (165) and exit (166) back to the main program.

The combination of an adaptive, tracking, reference waveform with an underlying true RMS estimate of the input power provides unique line fault detection in accordance with the present invention. The line fault detection of the invention exhibits fast results, good sensitivity, and reliable triggering to true fault conditions, while reducing the occurrence of false triggering due to noise. Of particular significance in a UPS system, operation can occur with an AC line input whose wave shape distortion would cause triggering with fixed reference waveforms, but whose power delivering capability is otherwise suitable for powering the protected load with proper filtering.

It is understood that the invention is not limited to the particular embodiments set forth herein as illustrative, but embraces all such modified forms thereof as come within the scope of the following claims.

What is claimed is:

1. AC line waveform monitoring apparatus for detecting AC line power faults and providing a fault signal for control of an uninterruptible power supply comprising:
   (a) means for sampling an AC line power signal at times synchronized with the cycle of the AC line waveform;
   (b) means for producing a reference waveform at selected sample times during the period of the AC line signal given previous reference waveform values and a prior cycle wherein a reference waveform value at each sample time comprises a selectively weighted average of value at that sample time in the prior cycle of the AC line signal and the previous reference waveform value at that sample time;
   (c) an uninterruptible power supply including an auxiliary power supply battery, the uninterruptible power supply receiving the AC line power and normally providing the AC line power to a load and responsive to a fault signal to switch to provide power to the load from the battery;
   (d) means for comparing the AC line signal waveform with the reference waveform at corresponding times in the reference waveform and the signal waveform and providing the fault signal to the uninterruptible power supply so that it provides power to the load from the battery when a selected difference condition is exceeded.

2. The apparatus of claim 1 wherein the means for producing a reference waveform does so in accordance with the expression:

$$REF_{i,k} = (1-a)REF_{i,k-1} + (a)SAMP_{i,k-1}$$

where a is choosen such that $0 < a < 1$, $REF_{i,k}$ is the present value of the reference at the i th sample point in the k th cycle, $REF_{i,k-1}$ is the value of the reference at the i th sample point in the (k−1)th cycle and $SAMP_{i,k-1}$ is the value of the sample of the AC line input waveform at the i th sample point in the (k−1)th cycle.

3. The apparatus of claim 2 wherein a=0.5.

4. The apparatus of claim 2 wherein the means for comparing compares to determine if the difference condition is exceeded in accordance with the expression:

$$|SAMP_{i,k} - REF_{i,k}| \geq D_i$$

where $D_i$ is a chosen tolerance value for the sample point i.

5. The apparatus of claim 4 wherein the value of $D_i$ is choosen to be a constant for all of the sample points i.

6. The apparatus of claim 1 wherein the apparatus is adapted for monitoring 60 Hz line power and wherein the means for sampling samples at a selected number of points in each cycle which are equally spaced in time.

7. The apparatus of claim 6 wherein the means for sampling samples at a rate of 64 times a cycle.

8. The apparatus of claim 1 wherein the means for sampling includes an analog to digital converter for converting the sampled analog value to digital data.

9. The apparatus of claim 1 wherein the means for sampling includes means for phase-locking the sample times to the period of the AC line signal so that sampling is carried out at equally spaced points in time over each cycle of the AC line waveform.

10. The apparatus of claim 1 further including means for providing an estimate of the RMS value of the AC line waveform and providing the fault signal if the RMS estimate value falls below a selected minimum value.

11. The apparatus of claim 10 wherein the means for estimating the RMS value carries out a root-mean square calculation on the reference waveform created by the means for producing a reference waveform.

12. The apparatus of claim 2 further including means for providing an estimate of the RMS value of the AC line waveform and providing the fault signal if the RMS estimate values falls below a selected minimum value, and wherein the RMS estimate $V_{rms}(est)$ is calculated in accordance with the expression:

$$V_{rms}(est) = \sqrt{\frac{1}{n} \sum_{i=0}^{n-1} REF_{i,k}^2}$$

where n is the number of samples per cycle, and wherein the fault signal is provided if $V_{rms}(est)$ is less than the selected minimum RMS value.

13. The apparatus of claim 1 wherein the means for comparing compares the absolute value of the difference between the reference waveform and the AC line signal waveform at each sample point with a selected difference level and provides a signal to increment a counter if the difference exceeds or is equal to the level and a signal to decrement the counter if the difference is less than the selected level, and wherein the fault signal is provided if the count in the counter exceeds a selected value indicative of the fault.

14. The apparatus of claim 12 wherein the number of samples n per cycle is 64.

15. AC line waveform monitoring apparatus for detecting AC line power faults and providing a fault signal for control of an uninterruptible power supply comprising:
(a) means for sampling an AC line power signal at times synchronized with the cycle of the AC line waveform;
(b) means for producing a reference waveform at selected sample times during the period of the AC line signal given previous reference waveform values and a prior cycle wherein a reference waveform value at each sample time comprises a selectively weighted average of sample values over a plurality of prior cycles of the AC line signal in accordance with the expression:

$REF_{i,k} = (1-a)REF_{i,k-1} + (a)SAMP_{i,k-1}$ wherein a is chosen such that $0 < a < 1$, $REF_{i,k}$ is the present value of the reference of the i th sample point in the k th cycle, $REF_{i,k-1}$ is the value of the reference at th ei th sample point in the (k−1)th cycle and $SAMP_{i,k-1}$ is the value of the sample of t he AC line input waveform at the i th sample point in the (k−1)th cycle;
(c) an uninterruptible power supply including an auxiliary power supply battery, the uninterruptible power supply receiving the AC line power and normally providing the AC line power to a load and responsive to a fault signal switch to provide power to the load from the battery;
(d) means for estimating the RMS value of the AC line signal by carrying out a root-mean square calculation on the reference waveform and providing the fault signal to the uninterruptible power supply so that it provides power to the load from the battery if the RMS estimate value falls below a selected minimum value.

16. The apparatus of claim 15 wherein $a = 0.5$.

17. The apparatus of claim 15 wherein the RMS estimate $V_{rms}(est)$ is calculated in accordance with the expression:

$$V_{rms}(est) = \sqrt{\frac{1}{n} \sum_{i=0}^{n-1} REF_{i,k}^2}$$

where n is the number of samples per cycle, and wherein a fault signal is provided if $V_{rms}(est)$ is less than the selected minimum RMS value.

18. The apparatus of claim 15 wherein the apparatus is adapted for monitoring 60 Hz line power and wherein the means for sampling samples at a selected number of points in each cycle which are equally spaced in time.

19. The apparatus of claim 18 wherein the means for sampling samples at a rate of 64 times a cycle.

20. The apparatus of claim 15 wherein the means for sampling includes an analog to digital converter for converting the sampled analog value to digital data.

21. The apparatus of claim 15 wherein the means for sampling includes means for phase-locking the sample times to the period of the AC line signal so that sampling is carried out at equally spaced points in time over each cycle of the AC line waveform.

22. The apparatus of claim 15 including means for comparing the absolute value of the difference between the reference waveform and the AC line signal waveform at each sample point with a selected difference level and incrementing a counter if the difference exceeds or is equal to the level and decrementing the counter if the difference is less than the selected level, and wherein the fault signal is provided if the count in the counter exceeds a selected value indicative of a fault.

23. The apparatus of claim 17 wherein the number of samples n per cycle is 64.

24. An uninterruptible power supply comprising:
(a) an auxiliary power supply battery;
(b) power transfer means, connected to the auxiliary power supply battery and to AC line power, for responding to control signals to provide power to an AC output from either the AC line power or the battery;
(c) control means for providing control signals to the power transfer means, the control means comprising:
(1) means for sampling the AC power line signal at times synchronized with the cycle of the AC line waveform;

(2) means for producing a reference waveform at selected sample times during the period of the AC line signal given previous reference waveform values and a prior cycle wherein a reference waveform value at each sample time comprises a selectively weighted average of the value at that sample time in the prior cycle of the AC line signal and the previous reference waveform value at that sample time;

(3) means for comparing the AC line signal waveform with the reference waveform at corresponding times in the reference waveform and the signal waveform and providing a fault signal when a selected difference condition is exceeded, and for determining from the fault signal when a selected fault condition has occurred and then controlling the power transfer means to switch to supply power from the battery during the fault condition.

25. The power supply of claim 24 wherein the means for producing a reference waveform does so in accordance with the expression:

$$REF_{i,k} = (1-a)REF_{i,k-1} + (a)SAMP_{i,k-1}$$

where a is choosen such that $0 < a < 1$, $REF_{i,k}$ is the present value of the reference at the i th sample point in the k th cycle, $REF_{i,k-1}$ is the value of the reference at the i th sample point in the (k−1)th cycle and $SAMP_{i,k-1}$ is the value of the sample of the AC line input waveform at the i th sample point in the (k−1)th cycle.

26. The power supply of claim 25 wherein a=0.5.

27. The power supply of claim 25 wherein the means for comparing compares in accordance with the expression:

$$|SAMP_{i,k} - REF_{i,k}| D_i$$

where $D_i$ is a chosen tolerance value for the sample point i.

28. The power supply of claim 27 wherein the value of $D_i$ is choosen to be a constant for all of the sample points i.

29. The power supply of claim 24 wherein the power supply receives 60 Hz line power and wherein the means for sampling samples at a selected number of points in each cycle which are equally spaced in time.

30. The power supply of claim 29 wherein the means for sampling samples at a rate of 64 times a cycle.

31. The power supply of claim 24 wherein the means for sampling includes an analog to digital converter for converting the sampled analog value to digital data.

32. The power supply of claim 24 wherein the means for sampling includes means for phase-locking the sample times to the period of the AC line signal so that sampling is carried out at equally spaced points in time over each cycle of the AC line waveform.

33. The power supply of claim 24 further including means for providing an estimate of the RMS value of the AC line waveform and providing the fault signal to the power transfer means to switch to supply power from the battery if the RMS estimate value falls below a selected minimum value.

34. The power supply of claim 33 wherein the means for estimating the RMS value carries out a root-mean square calculation on the reference waveform created by the means for producing a reference waveform.

35. The power supply of claim 25 further including means for providing an estimate of the RMS value of the AC line waveform and providing a signal to the power transfer means to switch to supply power from the battery if the RMS estimate values falls below a selected minimum value, and wherein the RMS estimate $V_{rms}(est)$ is calculated in accordance with the expression:

$$V_{rms}(est) = \sqrt{\frac{1}{n} \sum_{i=0}^{n-1} REF_{i,k}^2}$$

where n is the number of samples per cycle, and wherein the signal is provided if $V_{rms}(est)$ is less than the selected minimum RMS value.

36. The power supply of claim 24 wherein the means for comparing compares the absolute value of the difference between the reference waveform and the AC line signal waveform at each sample point with a selected difference level and provides a signal to increment a counter if the difference exceeds or is equal to the level and a signal to decrement the counter if the difference is less than the selected level, and wherein the fault condition is determined if the count in the counter exceeds a selected value indicative of the fault.

37. The power supply of claim 24 wherein the number of samples n per cycle is 64.

38. A method of AC line waveform monitoring for detecting AC line power faults and controlling an uninterruptible power supply comprising the steps of:
   (a) sampling an AC line signal at times synchronized with the cycle of the AC line waveform;
   (b) averaging together the sample values over a plurality of cycles of the AC line signal to create a reference waveform given previous reference waveform values and a prior cycle wherein a reference waveform value at each sample time comprises a selectively weighted average of the value at that sample time in the prior cycle of the AC line signal and the previous reference waveform value at that sample time;
   (c) comparing the AC line signal waveform with the reference waveform at corresponding times in the reference waveform and the signal waveform to determine when a selected difference condition between the reference waveform and the signal waveform is exceeded and providing a fault signal when the difference condition is exceeded;
   (d) providing the fault signal to an uninterruptible power supply to cause it to switch to provide power to a load from a battery in the uninterruptible power supply.

39. The method of claim 38 wherein the step of averaging is carried out to provide exponential averaging of the samples over the prior cycles with weights decreasing exponentially going back in time.

40. The method of claim 38 further including the step of phase-locking the sample times at which the AC line signal is sampled with the period of the AC line signal so that sampling is carried out at equally spaced points in time over each cycle of the AC line waveform.

41. The method of claim 38 further including the step of estimating the RMS value of the AC line waveform and comparing the value with a selected minimum value.

42. The method of claim 41 wherein the step of estimating the RMS values is performed by carrying out a root-mean square calculation on the reference waveform.

* * * * *

UNITED STATES PATENT AND TRADEMARK OFFICE
CERTIFICATE OF CORRECTION

PATENT NO. : 5,229,651
DATED : July 20, 1993
INVENTOR(S) : Baxter, et al.

It is certified that error appears in the above-indentified patent and that said Letters Patent is hereby corrected as shown below:

In column 4, line 2 of the patent, after "of" insert --systematically--

In column 6, line 1 of the patent, "$|samp_{i,k}-REF_{i,k} \geq D_i$" should be --$|samp_{i,k}-REF_{i,k}| \geq D_i$--

In column 13, line 67 of the patent, "th ei th" should be --the i th-- 1992.

In column 13, line 68 and column 14, line 1 of the patent, "oft he" should be --of the--

In column 15, line 35 of the patent, "$|samp_{i,k}-REF_{i,k}|D_i$" should be --$|samp_{i,k}-REF_{i,k}| \geq D_i$-- as written in the application on page 28, line 15.

In column 16, line 54 of the patent, "back" should be --backward-- as written in the application on page 30, line 23.

UNITED STATES PATENT AND TRADEMARK OFFICE
CERTIFICATE OF CORRECTION

PATENT NO. : 5,229,651
DATED : July 20, 1993
INVENTOR(S) : Baxter, et al.

It is certified that error appears in the above-indentified patent and that said Letters Patent is hereby corrected as shown below:

Column 16, line 62, "comparing the value" should read --comparing that -- value--

Signed and Sealed this

Twenty-eighth Day of June, 1994

Attest:

BRUCE LEHMAN

*Attesting Officer*     *Commissioner of Patents and Trademarks*